United States Patent [19]

Elgue et al.

[11] Patent Number: 4,889,700
[45] Date of Patent: * Dec. 26, 1989

[54] PROCESS AND DEVICE FOR SELECTIVE EXTRACTION OF $H_2S$ FROM AN $H_2S$-CONTAINING GAS

[75] Inventors: Jean Elgue, Lons; Olivier Oliveau; Jean-Louis Peytavy, both of Lescar, all of France

[73] Assignee: Societe Nationale Elf Aquitaine (Production), Paris, France

[*] Notice: The portion of the term of this patent subsequent to Jul. 4, 2006 has been disclaimed.

[21] Appl. No.: 67,259

[22] PCT Filed: Oct. 3, 1986

[86] PCT No.: PCT/FR86/00343
§ 371 Date: Jun. 3, 1987
§ 102(e) Date: Jun. 3, 1987

[87] PCT Pub. No.: Wo87/01962
PCT Pub. Date: Apr. 9, 1987

[30] Foreign Application Priority Data

Apr. 10, 1985 [FR] France ............................. 85 14743

[51] Int. Cl.$^4$ ............................................ C01B 17/16
[52] U.S. Cl. ..................... 423/220; 423/223; 423/228; 423/229; 423/242; 423/243; 423/563; 423/645; 55/48; 55/68; 55/73; 55/93
[58] Field of Search .............. 423/228, 229, 220, 223, 423/229, 243, 242, 563, 645; 55/48, 68, 73, 93

[56] References Cited

U.S. PATENT DOCUMENTS 4,129,425 12/1978 Stephenson et al. .................. 55/44
4,293,531 10/1981 Field et al. .......................... 423/232
4,519,991 5/1985 Oliveau et al. ..................... 423/229

FOREIGN PATENT DOCUMENTS 2305413 10/1976 France.
1545885 3/1976 United Kingdom ............... 423/229

Primary Examiner—Robert L. Stoll
Attorney, Agent, or Firm—Weiser & Stapler

[57] ABSTRACT

Method and devices for the selective removal of $H_2S$ from an $H_2S$-containing gas by contacting the gas in an absorption column with an $H_2S$-selective absorbent liquid and transferring the $H_2S$-charged absorbent liquid to the upper part of a second column. The charged absorbent liquid then travels to a regeneration zone at the bottom of the column, where it is heated to a temperature at which the absorbent liquid is vaporized and the $H_2S$ is released.

The regeneration zone temperature causes the absorbent liquid vapor to strip the $H_2S$ back to the upper part of the column where it forms an equilibrium with the $H_2S$-charged absorbent liquid at a temperature not more than 30° C. higher than the injection temperature of the absorbent liquid in the absorption column, which equilibrium temperature is maintained by the temperature in the regeneration zone. The $H_2S$-enriched vapor formed at the equilibrium point is then tapped.

21 Claims, 1 Drawing Sheet

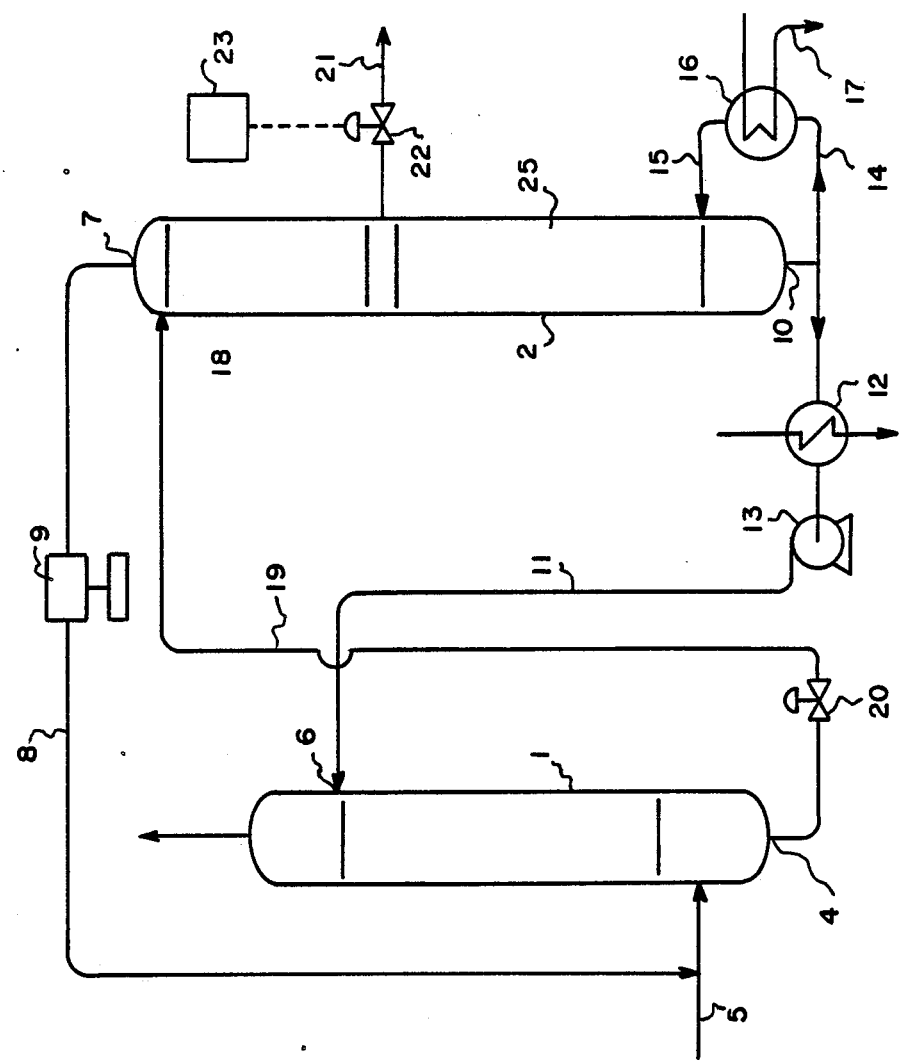

PROCESS AND DEVICE FOR SELECTIVE EXTRACTION OF H₂S FROM AN H₂S-CONTAINING GAS

The invention pertains to a process for selective extraction of $H_2S$ from an $H_2S$-containing gas. It also refers to a device for realizing this process.

Selective extraction of $H_2S$ from an $H_2S$-containing gas is usually used to eliminate the majority, or almost the entirety, of the $H_2S$ present in the said gas, to produce a desulfured gas with an $H_2S$ content below an imposed threshold and/or to generate a stream of acid gas which is rich in $H_2S$ and includes as low as possible a quantity of other acid compounds such as $CO_2$, with such a stream of acid gas being usable as a source of $H_2S$ for the production of sulfur according to the Claus process of controlled $H_2S$ oxidation or also for the synthesis of thioorganic compounds.

Such selective extraction of $H_2S$ is normally accomplished by washing the gas under treatment by means of an absorbent liquid which can be regenerated by heat and is selective for $H_2S$, i.e., an absorbent liquid which, on the one hand, is capable of retaining gaseous acid compounds such as $H_2S$ and $CO_2$ and returning practically the totality of these acid compounds by heating, and on the other hand, possesses an absorptive capacity which is distinctly greater with regard to $H_2S$ than to other acid compounds, particularly $CO_2$. The absorbent liquid fixes the gaseous acid compounds by simple physical dissolution and/or by dissolution after formation of a thermally unstable salt or complex by reaction between the said gaseous acid compounds and a basic compound, for example, an amine or alkanolamine, contained in the absorbent liquid.

In practice, the gas under treatment, which contains $H_2S$ and possibly other gaseous acid compounds such as $CO_2$, is brought into contact, in an absorption zone, with the selected absorbent liquid, circulating in countercurrent, so as to produce a gas with a reduced level of $H_2S$ which is drawn off from the top of the absorption zone, and tapping from the bottom of the said zone a stream of absorbent liquid charged with $H_2S$ and containing as little $CO_2$ and other gaseous acid compounds as possible. The said stream of absorbent liquid is then introduced into a regeneration zone in which it is subjected to conditions of temperature and pressure such as to produce almost complete release of the absorbed gaseous acid compounds, which are taken off from the top of the regeneration zone in the form of a gaseous acid effluent rich in $H_2S$, and to produce at the bottom of the regeneration zone a regenerated absorbent liquid practically free of dissolved gaseous acid compounds, which is tapped and reused as the absorbent liquid in the absorption zone.

When the gaseous acid effluent rich in $H_2S$ drawn off from the top of the regeneration zone does not contain a sufficient level of $H_2S$ to allow the said effluent to be used in the application envisaged, especially manufacture of sulfur by controlled oxidation of $H_2S$ or synthesis of thioorganic compounds, the operations are repeated, i.e., the gaseous acid effluent is treated in a second absorption zone with an absorbent liquid which is also selective for $H_2S$ and regeneratable by heating, to produce a stream of absorbent liquid highly charged with $H_2S$, which is conveyed to a second regeneration zone to be regenerated as indicated above, producing a gaseous acid effluent with a higher concentration of $H_2S$ than the gaseous acid effluent emerging from the first treatment.

Such a method of operation presents the disadvantage, among others, of requiring the use of very high-volume installations to produce a gaseous acid effluent sufficiently rich in $H_2S$ to be usable in the applications, cited above, for which it is designed, and for this reason it is very expensive.

The present invention proposes to remedy this disadvantage by offering a process for selective extraction of $H_2S$ from an $H_2S$-containing gas which makes it possible to produce a gaseous acid effluent highly enriched in $H_2S$ even if the concentration of $H_2S$ in the initial gas under treatment is low, with no need to use complex installations, the said process being most particularly suitable for the treatment of gases containing $H_2S$ such as are available at pressures which can reach several dozen bars. In addition, when the gas under treatment contains $CO_2$ in addition to the $H_2S$, the process according to the invention makes it possible to limit coabsorption of $CO_2$ by the absorbent liquid and therefore to greatly reduce the quantity of $CO_2$ passing into the gaseous effluent enriched in $H_2S$, even if the gas under treatment contains a high level of $CO_2$.

The process according to the invention for selective extraction of $H_2S$ from an $H_2S$-containing gas is of the type in which the gas under treatment is brought into contact, in an absorption zone, with an absorbent liquid which is selective for $H_2S$ and regeneratable by heating, circulating in countercurrent, so as to yield a gas with a reduced level of $H_2S$ at the top of the absorption zone and a stream of absorbent liquid charged with $H_2S$ at the bottom of the said zone, and a stream of absorbent liquid which has retained $H_2S$ is subjected to regeneration by heating, in a regeneration zone, to release the absorbed gases and form a gaseous acid effluent rich in $H_2S$ at the top of the regeneration zone and produce a regenerated absorbent liquid at the bottom of this regeneration zone, with the said regenerated absorbent liquid being tapped and recycled into the absorption zone for contact with the gas under treatment, and it is characterized by the fact that the stream of absorbent liquid charged with $H_2S$ emerging from the absorption zone is introduced, without having been heated, into the upper part of a mixed treatment zone in which the said absorbent liquid flows towards the lower part; that the absorbent liquid is provided, in the lower part of the said mixed zone, with sufficient heat energy to release the gaseous acid compounds absorbed by the said absorbent liquid and thus to regenerate the said absorbent liquid; that a stream of regenerated absorbent liquid is tapped from the bottom of the said mixed zone and is used, after cooling, to constitute a portion or the totality of the absorbent liquid introduced into the absorption zone; that a gaseous acid effluent highly enriched in $H_2S$ is produced by tapping, at a point in the mixed treatment zone located between the entry point of the absorbent liquid charged with $H_2S$ emerging from the absorption zone and the lower part of the mixed zone where the heat energy is supplied, only a portion of the gaseous phase available at that point in the mixed treatment zone and resulting from regeneration of the absorbent liquid; and that the remainder of the gaseous phase resulting from regeneration of the absorbent liquid is collected at the top of the mixed zone.

In the mixed treatment zone, the space between the level at which the absorbent liquid charged with $H_2S$ emerging from the absorption zone is introduced and the level at which the gaseous acid effluent highly enriched in $H_2S$ is tapped constitutes an enrichment zone, while the space between the said tapping level and the bottom of the mixed treatment zone acts as the regeneration zone.

The flow rate of the gaseous acid effluent highly enriched in $H_2S$ which is tapped from the mixed treatment zone depends on the $H_2S$ concentration that one wishes to obtain in the said effluent, and more precisely, varies inversely with the said concentration. The said flow rate of gaseous acid effluent enriched in $H_2S$ represents a fraction of the total flow of the gaseous acid compounds present in the gas under treatment, this fraction being lower, the higher the $H_2S$ concentration desired in the enriched gaseous acid effluent.

The process according to the invention can be used to selectively extract the $H_2S$ contained in any type of gas which is available at a pressure between approximately 3 bars absolute and approximately 100 bars absolute. In particular, such a process is well suited for treating the various natural gases containing $H_2S$ and $CO_2$ to produce a desulfured gas with a fixed minimum $H_2S$ content and simultaneously to form a gaseous acid effluent highly enriched in $H_2S$ and with a reduced level of $CO_2$, as well as for the treatment of synthesis gases containing $H_2S$ in addition to a significant quantity of $CO_2$ to eliminate almost all of the $H_2S$ while limiting coabsorption of $CO_2$.

The absorbent liquid which can be used to selectively extract the $H_2S$ can be selected from among the various absorbent liquids having sufficient selectivity for $H_2S$ and capable of being regenerated by heating and more especially by boiling. The absorbent liquid can be based on one or more solvents with a physical action such as methanol, polyethylene glycol dimethylethers, N-methylpyrrolidone, sulfolane or phosphoric esters, or it can consist of a solvent with a chemical action consisting of an aqueous solution of one or more compounds which fix acid gases of the $H_2S$ or $CO_2$ type in the form of thermally unstable complexes or salts, such as for example, an aqueous solution of an alkanolamine such as methyl diethanolamine, triethanolamine or diisopropanolamine. The absorbent liquid can also be selected from mixtures of the two types of solvents mentioned above, such as for example, mixtures of water/diisopropanolamine/sulfolane, mixtures of water/methyl diethanolamine/sulfolane and mixtures of water, methanol and one or more amines such as methyl diethanolamine, monoethanolamine, diethanolamine and diisopropanolamine. Especially suitable as an absorbent liquid which is selective for $H_2S$ and regeneratable by heating is an aqueous solution of an alkanolamine such as methyl diethanolamine, triethanolamine and diisopropanolamine, in which the alkanolamine concentration is between 1N and 8N, preferably between 3N and 6N.

The pressure prevailing in the absorption zone essentially corresponds to that of the gas under treatment, which is injected into this zone and therefore can range between approximately 3 bars absolute and approximately 100 bars absolute.

The temperature to be selected for contact, in the absorption zone, between the gas under treatment and the absorbent liquid circulating in countercurrent is not critical and depends, among other things, on the nature of the absorbent liquid used. For example, for an absorbent liquid selected from among the aqueous alkanolamine solutions, absorption temperatures ranging from approximately 10° C. to approximately 80° C. can be selected. The temperature in the absorption zone generally substantially corresponds to that of the absorbent liquid introduced into this zone.

The flow rate of the absorbent liquid which circulates in the absorption zone in countercurrent to the gas under treatment is linked, among other things, to the $H_2S$ concentration of the gas under treatment and also to the quantity of $H_2S$ which can be tolerated in the desulfured gas drawn off at the top of the absorption zone. The said flow rate of the absorbent liquid is adjusted so as to yield, at the top of the absorption zone, a desulfured gas meeting the imposed specification in terms of $H_2S$ concentration.

The temperature and pressure conditions imposed on the regeneration space or regeneration zone of the mixed treatment zone are selected, bearing in mind the nature of the absorbent liquid used to fix the $H_2S$, so that the said $H_2S$ and the other gaseous acid compounds such as $CO_2$ retained by the absorbent liquid during its passage through the absorption zone and then through the enrichment space or enrichment zone of the mixed treatment zone are released, and that the absorbent liquid tapped from the bottom of the regeneration zone, i.e., from the bottom of the mixed treatment zone, is practically free of dissolved gaseous acid compounds. The absolute pressure in the upper part of the regeneration zone is generally between 1 and 5 bars and is most often located between 1.3 and 2.5 bars. Maintenance of such a pressure requires a temperature at the bottom of the regeneration zone which is usually between 100° C. and 180° C. approximately, which corresponds to a temperature at the top of the regeneration zone ranging from approximately 80° C. to approximately 125° C.

The required temperature in the lower part of the regeneration zone is maintained by adding the necessary heat energy to the absorbent liquid arriving at the said part of the regeneration zone; this addition of heat energy can be achieved by any known technique, advantageously by boiling.

In the enrichment zone present in the mixed treatment zone, the absorbent liquid, which comes from the absorption zone without being heated and already contains a certain quantity of $H_2S$ and other absorbed gaseous acid compounds such as $CO_2$ extracted from the gas under treatment injected into the absorption zone, encounters the gaseous acid compounds released during regeneration, and because of its selectivity for $H_2S$, it reabsorbs an additional quantity of $H_2S$; because of that fact, the gaseous phase in equilibrium with the absorbent liquid in the said enrichment zone, in the vicinity of the regeneration zone, has an $H_2S$ concentration distinctly greater than that of the gaseous phase which would be obtained by regeneration of the absorbent liquid emerging from the absorption zone. By controlling the flow of gaseous acid effluent tapped from the mixed treatment zone, it is possible to adjust the $H_2S$ concentration of this gaseous flow to the desired value.

The temperatures prevailing in the enrichment zone have values intermediate between the values which this parameter assumes at the top of the regeneration zone and at the bottom of the absorption zone. It is advantageous if the heat energy supplied to the absorbent liquid in the lower part of the regeneration zone is controlled so that the temperature in the enrichment zone of the mixed treatment zone, at the level where the gaseous acid effluent highly enriched in $H_2S$ is tapped, is only slightly higher, and more especially is not more than 20° to 30° C. higher than the temperature of the absorbent liquid which is introduced into the upper part of the absorption zone, which makes it possible to tap a gaseous acid effluent highly enriched in $H_2S$ which contains little or no water vapor.

The gas stream emerging from the top of the enrichment zone, i.e., from the top of the mixed treatment zone, is at a pressure lower than that of the gaseous acid phase present at the top of the regeneration zone. It is advantageous if this gas stream is reintroduced into the absorption zone after it has been brought by compression to a pressure substantially equal to that of the gas under treatment injected into the absorption zone.

If necessary, the stream of absorbent liquid charged with $H_2S$ which emerges from the absorption zone is depressurized to bring its pressure to a value compatible with the pressure prevailing in the enrichment zone of the mixed treatment zone before being introduced into this zone without being reheated.

A device for implementing the process according to the invention is of the type comprising an absorption column, equipped at the top with an outlet for gases and at the bottom with an outlet for liquids, and is equipped, in its lower half, with a conduit for injecting the gas under treatment, and in its upper half, with an inlet for the absorbent liquid; and a second column which, on the one hand, is equipped at the top with an outlet for gases and, at the bottom, with an outlet for liquid, and on the other hand, is equipped in its lower part with a heating system and, in its upper part, with a liquid inlet, with the outlet for liquids at the bottom of the second column being connected by means of a recycling conduit to the absorbent liquid inlet on the absorption column, while the liquid inlet of the said second column is connected by means of a conduit to the liquid outlet at the bottom of the absorption column, and it is characterized by the fact that an element for tapping a gaseous effluent, preferably arranged so as to allow controlled variation in the tapping flow rate, is installed on the second column between the liquid inlet and the heating system with which the said column is equipped.

In the second column, the space between the liquid inlet level and the level of the tapping element acts as the enrichment zone, while the space defined between the level of the tapping element and the bottom of the said column acts as a regeneration zone.

Advantageously, the outlet for gases at the top of the second column is connected to the absorption column, below the absorbent liquid inlet, by means of a conduit in which a compressor is inserted.

If necessary, a pressure-relief valve can be installed on the conduit connecting the liquid outlet of the absorption column to the liquid inlet of the second column.

The recycling conduit connecting the liquids outlet at the bottom of the second column to the absorbent liquid inlet of the absorption column is generally equipped with a pump and a cooling system which operates by indirect heat exchange.

Each of the columns which comprise the device according to the invention can be of any known type normally used for bringing a gas into contact with a liquid and can, for example, consist of a plate column or of a packed column.

The number of plates or the equivalent packing height of the columns used is selected so that during operation each of the columns acts correctly so as to produce the desired $H_2S$ enrichment in the gaseous acid effluent tapped from the second column through the tapping element and so that a gas containing the imposed minimum $H_2S$ content can be drawn off at the top of the absorption column.

A better understanding of the invention will be gained by reading the following description of one of its embodiments, illustrated by the FIGURE in the attached drawing showing a device according to the invention using two plate columns.

Referring to the FIGURE, the device for selectively extracting $H_2S$ from $H_2S$-containing gas comprises two columns, namely, an absorption column 1 and a second column 2, called the mixed treatment column, each of which is equipped with gas/liquid contact plates. Column 1 is equipped at the top with an outlet 3 for gases and at the bottom with an outlet 4 for liquids, and it is also equipped, in its lower part, with a conduit 5 for injecting gas under treatment and, in its upper half, with a liquid inlet 6. The column 2 has at the top, on the one hand, an outlet 7 for gases, which is connected through a conduit 8 into which a compressor 9 is inserted, to the conduit 5 for injecting the gas under treatment with which the column 1 is equipped and, on the other hand, at the bottom with an outlet 10 for liquids, with the said outlet being connected, through a recycling conduit 11, through the hot exchange circuit of an indirect heat exchanger 12 and a pump 13, to the liquid inlet 6 of the absorption column. In its lower part, the column 2 is associated, through inlet 14 and outlet 15 tubes, with a boiler 16 heated by indirect heat exchange by means of saturated water vapor circulating in a tubing system 17, while, in its upper portion, the said column is equipped with a liquid inlet 18 which communicates with the outlet 4 for liquids at the bottom of the absorption column through a conduit 19 on which is installed a pressure-relief valve 20. The column 2 is also equipped with an element for tapping a gaseous effluent, which is placed between the level of the liquid inlet 18 and the level of the boiler 16 and consists of a tapping conduit 21 equipped with a valve 22 with a variable opening. The said valve is controlled either manually or advantageously, as shown, by a regulator 23, which can be a flow regulator or a regulator controlling the concentration of $H_2S$ in the gaseous effluent tapped through the valve. In the column 2, the space 24 located between the level of the liquid inlet 18 and the level of the tapping element comprising the tapping conduit 21 acts as an enrichment zone, while the space 25 located between the level of the tapping element and the bottom of the column acts as a regeneration zone.

The operation of this device can be sketched out as follows:

The gas under treatment, which contains $H_2S$ for extraction and also, for example, $CO_2$ extraction of which is to be limited as far as possible, arrives under pressure at the absorption column 1 through the conduit 5 and encounters, in countercurrent, the absorbent liquid which is selective for $H_2S$ and regeneratable by heating, which is introduced, through the recycling conduit 11, at the inlet point 6 of the absorption column and flows by gravity into the said column. Because of its selectivity for $H_2S$, the absorbent liquid fixes the majority of the $H_2S$ present in the gas under treatment as well as a lesser quantity of $CO_2$. A gas whose $H_2S$ content has been decreased to the desired minimum value is drawn off through the outlet 3 of the absorption column 1.

The absorbent liquid charged with the gaseous acid compounds $H_2S$ and $CO_2$ absorbed in the absorption column 1 emerges from the said column through the outlet 4 and flows through the conduit 19, passing through the pressure-relief valve 20 so that its pressure is reduced to a value compatible with that prevailing in the column 2, reaching the column 2 which it enters at the liquid inlet point 18. In this column 2, the absorbent liquid charged with the gaseous acid compounds $H_2S$ and $CO_2$ absorbed in the absorption column, passes through the enrichment zone 24, whose role will be explained later, and reaches the regeneration zone 25. In this latter zone, the absorbent liquid is kept boiling under a pressure greater than atmospheric pressure, the said pressure generally being between 1 and 5 bars absolute, so as to release the absorbed gaseous acid compounds and to allow them to be stripped by the vapors of the absorbent liquid. The regenerated absorbent liquid is tapped through the outlet 10 for liquids of the column 2 and is returned to the absorption column 1 through the recycling conduit 11 opening at point 6 in the said column 1, under the action of the pump 13, and after having been cooled in the heat exchanger 12 to the appropriate temperature for contact with the gas under treatment in the absorption column 1. The heat required to keep the absorbent liquid boiling in the regeneration zone 25 of the column 2 is furnished by passing a portion of the regenerated liquid tapped through the outlet 10 into the boiler 16 heated by the saturated water vapor passing into the tubing 17 and returning the hot absorbent liquid to the regeneration zone through the tubing 15. The heat energy furnished to the absorbent liquid in the boiler is preferably controlled, by any known means for the purpose, so that the temperature in the column 2 at the level of the tapping element for the gaseous effluent highly enriched in $H_2S$ is no more than 20° to 30° C. higher than the temperature of the absorbent liquid entering the column 1 at the point 6, which makes it possible to tap a practically dry gaseous effluent at the conduit 21 through the valve 22.

The gaseous acid compounds $H_2S$ and $CO_2$ released in the regeneration zone 25 of the column 2 are stripped out of this zone by the vapors of the absorbent liquid and are therefore brought into the enrichment zone 24 of the said column, where they encounter the absorbent liquid arriving from the absorption column 1 and therefore containing a certain quantity of absorbed $H_2S$ and $CO_2$ extracted from the gas under treatment injected into the absorption column.

In the enrichment zone 24 of the column 2, the absorbent liquid, because of its selectivity for $H_2S$, reabsorbs a substantial quantity of $H_2S$, so that in the part of the said zone located in the vicinity of the tapping level the gaseous phase in equilibrium with the absorbent liquid has an $H_2S$ concentration substantially higher than the gaseous phase which can be obtained by regeneration of the absorbent liquid emerging directly from the absorption zone.

Through the valve 22 installed in the tapping conduit 21, it is possible to collect a gaseous acid effluent highly enriched in $H_2S$. The flow of this effluent only represents a fraction of the flow of the gaseous acid compounds $H_2S$ and $CO_2$ available in the gas under treatment reaching the column 1 through the conduit 5, with this fraction being lower, the higher the desired value for the $H_2S$ concentration in the collected effluent.

The gaseous acid compounds not absorbed in the enrichment zone 24 of the column 2 emerge through the gas outlet 7 at the top of the said column and are injected through the conduit 8 into the inlet conduit 5 for the gas under treatment on the absorption column 1, after having been brought, in the compressor 9, to a pressure substantially equal to that of the gas under treatment. In this manner, the majority of the $CO_2$ is found in the gas with a reduced $H_2S$ concentration which is drawn off through the gas outlet 3 of the absorption column 1.

To complete the description of the process according to the invention which has just been presented, a concrete example, not limiting in character, of an embodiment is given below.

EXAMPLE

A natural gas essentially consisting of methane and containing 1% $H_2S$ and 3% $CO_2$ by volume as acid impurities was treated using a device similar to that described with reference to the figure on the attached drawing.

In the particular device used, the absorption column 1 and the mixed treatment column 2 contained 14 and 28 plates, respectively.

The absorbent liquid consisted in a 4N aqueous solution of methyl diethanolamine.

Counting the plates of the column 2 from the top of the latter, the point of inlet for the absorbent liquid emerging from the absorption column was located slightly above the first plate, while the tapping conduit 21 was mounted between the tenth and eleventh plates, which was the equivalent of forming, in the column 2, an enrichment zone 24 and a regeneration zone 25, comprising 10 and 18 plates, respectively.

The gas under treatment arrived in the absorption column 1, through the conduit 5, at a flow rate of 210,000 $Nm^3/h$, an absolute pressure of 10 bars and a temperature of approximately 50° C., and in the said column, encountered in countercurrent the aqueous solution of methyl diethanolamine introduced into the column 1 at the point 6, through the recycling conduit 11, at a flow rate of 320 $m^3/h$ and a temperature of approximately 62° C.

A desulfured natural gas containing 10 ppm by volume of $H_2S$ and 2.4% $CO_2$ was drawn off through the gas outlet 3 of the absorption column.

The aqueous solution of methyl diethanolamine was brought, at the bottom of the regeneration zone 25 of the column 2, to a temperature of approximately 130° C. by saturated water vapor under an absolute pressure of 4 bars, circulating in the tubing 7 of the boiler 16. The pressure at the bottom of the regeneration zone 25, i.e., at the bottom of the column 2, was 2.4 bars.

The temperature in the enrichment zone 24, and particularly at the level of tapping conduit 21 for the gaseous acid effluent enriched in $H_2S$, was approximately 64° C., which substantially corresponded to that of the absorbent liquid charged with $H_2S$ arriving through the conduit 19 from the absorption column.

A portion, namely, 3,200 $Nm^3/h$, of the gaseous acid compounds released in the regeneration zone 25 of the column 2 was tapped through the conduit 21 through the valve 22 to form a gaseous acid effluent enriched in $H_2S$. The said gaseous effluent, which was at a temperature of approximately 64° C. and was saturated with water vapor, contained 66% $H_2S$ and 34% $CO_2$ by volume.

A gas stream with an absolute pressure of 2 bars and a temperature of 64° C. containing 90% $CO_2$ and 10%

$H_2S$ by volume was drawn off at the top of column 2, the said stream having a flow rate of 2,200 $Nm^3/h$. This gas stream was injected through the conduit 8 into the main stream of 210,000 $Nm^3/h$ of natural gas under treatment arriving through the conduit 5 into the absorption column, after its pressure had been raised, in the compressor 9, to a value substantially equal to that of the natural gas under treatment.

On the basis of the information supplied in the above example, it is evident that application of the process according to the invention to the treatment of the above-mentioned natural gas makes it possible, on the one hand, to produce a natural gas which is practically desulfured and can be delivered into distribution circuits and on the other hand, to produce a gaseous acid effluent which is highly enriched in $H_2S$ (composition 66% $H_2S$ and 34% $CO_2$ by volume) and practically dry; such a gaseous effluent can be directly used as a source of $H_2S$ for Claus sulfur plants performing controlled combustion of $H_2S$ into sulfur.

We claim:

1. A process for the selective extraction of $H_2S$ from a gas containing a plurality of gaseous acid compounds, one of which is $H_2S$, by operating in a first column comprising an absorption zone and a second column comprising a mixed treatment zone provided with an upper enrichment zone and a lower regeneration zone, said process comprising the steps of introducing into the absorption column an absorbent liquid for acid compounds, which is selective for $H_2S$ and regeneratable by heating, and circulating said absorbent liquid and the gas to be treated in countercurrent in said absorption zone to yield a treated gas with a reduced level of $H_2S$ and a stream of absorbent liquid charged with said gaseous acid compounds, transporting said stream of absorbent liquid charged with said gaseous acid compounds to the second column and introducing said stream of charged absorbent liquid into the upper enrichment zone, said stream of charged absorbent liquid travelling through the enrichment zone to the regeneration zone at the bottom of the second column, heating the absorbent liquid charged with the gaseous acid compounds in the lower regeneration zone, thereby releasing said gaseous acid compounds and obtaining a regenerated absorbent liquid and also a gaseous acid effluent, the latter containing the released gaseous acid compounds and being richer in $H_2S$ than the gaseous acid compound fraction of the gas to be treated, transporting the $H_2S$-rich gaseous acid effluent into the upper enrichment zone by stripping said effluent with the absorbent liquid vapor generated by said heating, contacting in said upper enrichment zone the $H_2S$-rich gaseous acid effluent with the charged absorbent liquid flowing from the absorption column and forming an equilibrium between the $H_2S$-rich gaseous acid effluent and said charged absorbent liquid, tapping at the equilibrium location a fraction of the $H_2S$-rich gaseous effluent available at said location, controlling the heat supplied to the lower regeneration zone to maintain a temperature difference of no more than about 30° C. between the temperature in the enrichment zone at the tapping level and the temperature of the absorbent liquid entering the absorption column, and collecting at the top of the second column upper enrichment zone the remainder of the gaseous acid effluent resulting from the regeneration of the charged absorbent liquid in the lower regeneration zone.

2. The process according to claim 1, wherein the temperature in the enrichment zone at the tapping level is no more than about 20° C. higher than the temperature of the absorbent liquid entering the absorption column.

3. The process according to claim 1, wherein the lower the ratio of the flow of deabsorbed $H_2S$-rich gaseous acid effluent tapped from the second column upper enrichment zone equilibrium location to the total flow of acid gases under treatment, the higher the concentration of $H_2S$ in the deabsorbed gaseous acid effluent.

4. The process according to claim 3, wherein the flow rate of the deabsorbed gaseous acid effluent tapped from the second column upper enrichment zone equilibrium location is about 3,200 $Nm^3/h$, the total flow rate of the gas under treatment is about 210,000 $Nm^3/h$, the $H_2S$ content of the gas under treatment is about 1% by volume and the $H_2S$ content of the gaseous acid effluent tapped is about 66% by volume.

5. The process according to claim 1, wherein the stream of absorbent liquid charged with gaseous acid compounds transported to the second column from the absorption column is depressurized before being introduced into the second column upper enrichment zone, to bring its pressure to a value approximately equal to the pressure prevailing in the second column upper enrichment zone.

6. The process according to claim 1, wherein the gas stream collected at the top of the second column upper enrichment zone is reintroduced into the absorption column after having been brought by compression to a pressure essentially equal to that of the gas under treatment injected to the absorption column.

7. The process of claim 1, wherein the regenerated absorbent liquid is tapped from the bottom of the second column, cooled, and reintroduced into the absorption column.

8. The process according to claim 1, wherein the gas under treatment is injected into the absorption zone under an absolute pressure between about 3 bars and about 100 bars.

9. The process according to claim 1, wherein the absorbent liquid comprises at least one solvent selected from the group consisting of methanol, polyethylene gylcol dimethyl ether, N-methyl pyrrolidone, sulfolane, phosphoric esters and alkanolamines.

10. The process according to claim 9, wherein the absorbent liquid comprises an aqueous solution of at least one solvent.

11. The process according to claim 10, wherein the absorbent liquid is an aqueous solution of at least one alkanolamine that selectively fixes $H_2S$.

12. The process according to claim 1, wherein the alkanolamine which selectively fixes $H_2S$ is selected from the group consisting of methyldiethanolamine, diisopropanolamine and triethanolamine.

13. The process according to claim 12, wherein the alkanolamine is methyldiethanolamine.

14. The process according to claim 9, wherein said absorbent liquid is a mixture of methanol and at least one alkanolamine selected from the group consisting of methyldiethanolamine, monoethanolamine, diisopropanolamine and diethanolamine.

15. The process according to claim 10, wherein the absorbent liquid is an aqueous solution of sulfolane and an alkanolamine selected from the group consisting of diisopropanolamine and methyldiethanolamine.

16. The process according to claim 11, wherein the concentration of the alkanolamine in the aqueous absorbent liquid is between about 1N and about 8N.

17. The process according to claim 16, wherein said concentration is between about 3N and about 6N.

18. The process according to claim 1, wherein the gas under treatment comprises $H_2S$ and $CO_2$.

19. The process according to claim 1, wherein the gas under treatment is discharged at the top of the absorption column and is essentially free of $H_2S$.

20. The process of claim 1 wherein the temperature difference of no more than about 30° C. is controlled by recycling a portion of the regenerated absorbent liquid from the bottom of the regeneration zone through a heating means and reintroducing the regenerated absorbent liquid into the regeneration zone.

21. The process of claim 1 further comprising the steps of tapping a portion of the regenerated absorbent liquid from the bottom of the regeneration zone in the second column through a indirect heat exchange means and then through the absorption column and introducing the absorbent liquid charged with said gaseous acid compounds into the regeneration zone in the second column.

* * * * *

UNITED STATES PATENT AND TRADEMARK OFFICE
CERTIFICATE OF CORRECTION

PATENT NO. : 4,889,700
DATED : December 26, 1989
INVENTOR(S) : Elgue et al

It is certified that error appears in the above-indentified patent and that said Letters Patent is hereby corrected as shown below:

On the title page, item 30, change "Apr. 10, 1985" to —October 4, 1985—.

Column 8, line 50, change "tubing 7" to —tubing 17—.

Claim 12, change "claim 1" to —claim 11—.

Signed and Sealed this

Seventh Day of February, 1995

Attest:

BRUCE LEHMAN

Attesting Officer        Commissioner of Patents and Trademarks